Feb. 13, 1968
H. J. HALL
3,368,963
APPARATUS FOR REMOVING CONTAMINANTS
FROM HIGH-RESISTIVITY FLUIDS
Filed Oct. 6, 1964
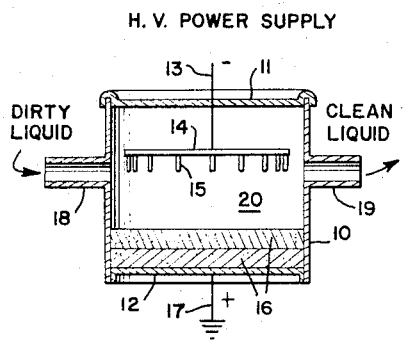
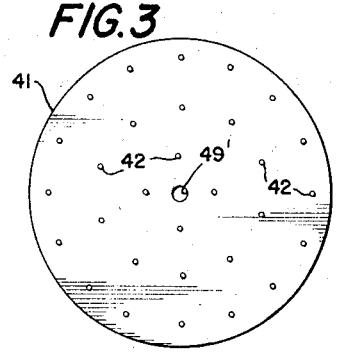
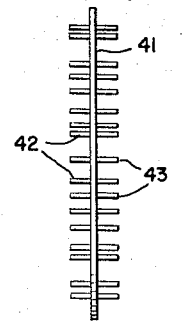
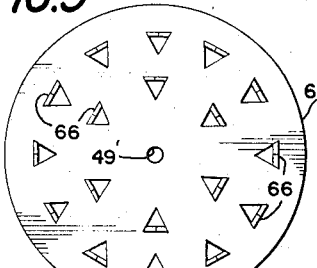
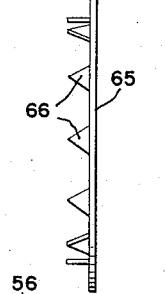
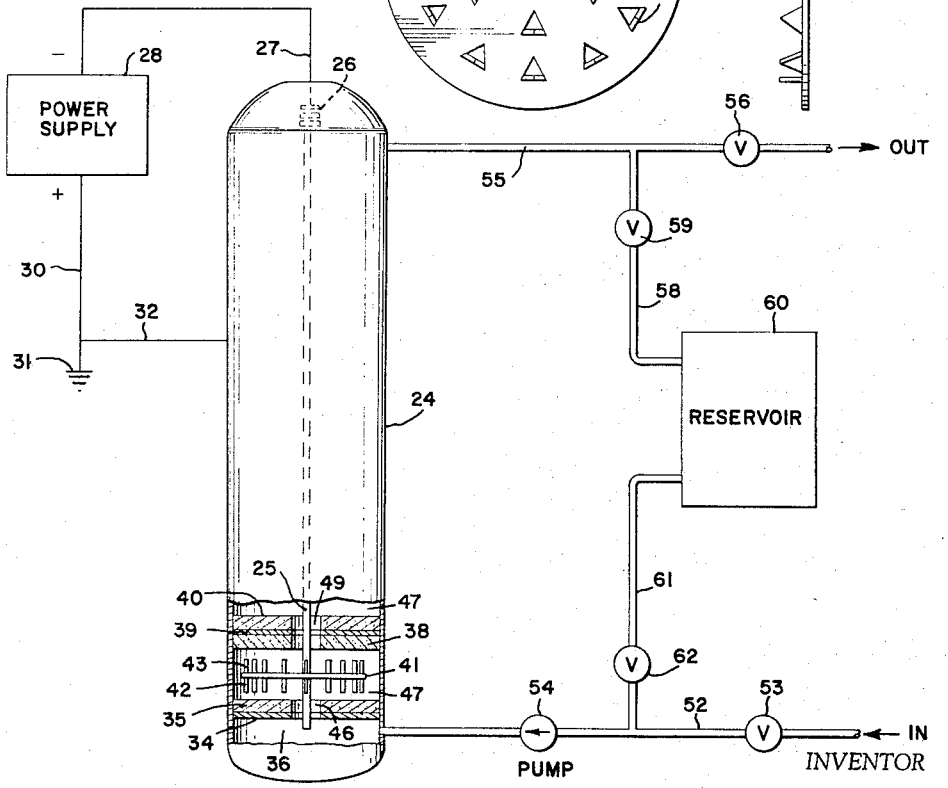
INVENTOR
HERBERT J. HALL
BY *Stowell & Stowell*
ATTORNEYS

# United States Patent Office 3,368,963
Patented Feb. 13, 1968

3,368,963
APPARATUS FOR REMOVING CONTAMINANTS FROM HIGH-RESISTIVITY FLUIDS
Herbert J. Hall, Skillman, N.J., assignor to Research-Cottrell, Inc., Bridgewater Township, N.J., a corporation of New Jersey
Continuation-in-part of application Ser. No. 369,689, May 25, 1964. This application Oct. 6, 1964, Ser. No. 405,004
4 Claims. (Cl. 204—302)

ABSTRACT OF THE DISCLOSURE

Single or series-arranged units for removing and collecting particulate and liquid contaminants from high resistivity fluids such as oils, fuels or solvents utilize high voltage divergent electrostatic fields which effect a plurality of closely spaced electrostatic discharges into a continuous fluid flow. The contaminants acquire a charge and are impelled from the fluid and embedded in a replaceable porous non-conducting matrix located adjacent the flow path, where they are held by entrapment in the pores and by pressure of the electrostatic field. The highly divergent field produced by a plurality of pointed discharge electrodes provides turbulent mixing of the fluid, and the synergistic combination of fluid turbulence and electrical field forces effects optimum contaminant removal.

---

This application is a continuation-in-part of abandoned application Ser. No. 369,689 filed May 25, 1964.

This invention relates to a method and apparatus for the removal of particulate and liquid contaminants from generally non-conductive or high-resistivity fluids by means of electrostatic fields.

It is frequently desirable and important to remove liquid and particulate contaminants from high-resistivity fluids and liquids, particularly insulating fluids such as petroleum based oils and the like. This has been found to be quite difficult from a practical standpoint with filters of the kind wherein the fluid to be decontaminated passes through the filter media, and it is characteristic of such filters that they shortly become clogged with solid materials, thus rendering the filter elements useless or at least of substantially reduced efficiency. At the same time, it is highly desirable to remove contaminating matter from such liquids in a continuous operation, that is, while the liquid flows continuously through the apparatus used for separating the contaminants from the liquid.

An important object of the present invention is to provide a novel electrostatic method for driving contaminants which may be organic, inorganic, conductive, non-conductive, solid or immiscible liquids or mixtures thereof from a high-resistivity fluid to be cleaned rapidly and thoroughly into a matrix where they are held by entrapment in pores and by the pressure of the electrostatic field.

Another object is to provide such a device which will remove finely entrained solids and/or water from dielectric liquids having high electrical resistivity and high breakdown voltage. Effective solids decontamination has been demonstrated with resistivities from $10^9$ to $10^{14}$ ohm-cm and above, and breakdown voltage in excess of 40 volts/mil.

A further object is to provide such a device which will effectively remove contaminants from dielectric liquids having viscosities in the range of 0.5 to 600 centistokes.

A further object is to provide high voltage electric fields to accomplish the results stated while the oil or other high-resistivity liquid flows through the fields.

A further object is to provide such a method wherein high voltage electrodes impress very high electrostatic fields upon contaminants in the liquid to be cleaned and the particulate or liquid contaminants acquire electric charges and are driven into a porous non-conducting collecting medium.

A further object is to provide an apparatus for carrying out the method wherein pointed discharge electrodes project into the liquid to be cleaned which flows between the electrodes and a porous matrix medium adapted to hold contaminants which are embedded therein by the driving force of the electric field.

A further object is to provide an apparatus which provides a flow path for the dirty liquid having interposed in the flow path a conducting plate provided with pointed discharge electrodes projecting in spaced relation toward a porous medium.

A further object is to provide a low pressure drop collector which will remove fine particles in the range of from 0 to about 100 microns and such a device that is particularly effective on fines below 5 microns.

A further object is to provide an apparatus of this character wherein a plurality of the electrostatic particle-removing units are serially arranged to subject the liquid to be cleaned to successive electrostatic action of the type referred to as the fluid passes through the successive units.

A further object is to provide simple and relatively light-weight high-resistivity fluid decontaminating apparatus particularly suited for both stationary and mobile installations. For example, the improved apparatus may comprise a portion of a packaging line for lubricating oil with the oil passing through the decontaminator prior to being sealed in containers. The assembly may also be mounted on an oil dispensing vehicle at air fields or the novel decontaminating apparatus may be mounted on its own wheeled frame and form a portion of a mobile fluid dispensing system.

Other objects and advantages of the invention will become apparent during the course of the following description.

In the drawing there are shown several embodiments of the invention wherein:

FIGURE 1 is a sectional view illustrating the basic system with one electrostatic unit therein;

FIGURE 2 is a diagrammatic view showing a modified form of a continuous system, an electrostatic unit casing being shown in elevation with parts broken away in section;

FIGURE 3 is a face view of an electrostatic plate showing one type of electrodes projecting therefrom;

FIGURE 4 is an edge elevation of the same;

FIGURE 5 is a face view of a modified type of plate; and

FIGURE 6 is an edge view of the same.

Throughout the specification and claims the term "particulate contaminants" includes inorganic, organic, conductive, and non-conductive solid particles and liquids immiscible in the high-resistivity fluid to be cleaned by the method and in the apparatus of the present invention.

The terms "non-conductive," "high-resistivity" or "dielectric" liquids mean liquids having resistivities in the order of about $10^9$ to about $10^{14}$ ohm-cm. and above and liquids having breakdown voltages which may be in excess of 40 volts/mil. These properties include almost all hydraulic fluids, lubricating oils, petroleum and synthetic base feed stocks, jet and turbine fuels, as well as many types of solvents used in cleaning operations.

The effective removal of water can be achieved in the lower viscosity high-resistivity fluids, i.e., below about 50 centistokes down to the solubility limits of water in the liquid to be cleaned. For petroleum based liquids, this is usually in the range of about 70 p.p.m. by weight at ambient temperatures. However, water contamination levels as high as 1000 p.p.m. can be decontaminated in the apparatus of the invention. Levels of water contamination higher than 1000 p.p.m. first should be precleaned with, for example, mechanical water coalescers to levels of about 1000 p.p.m.

Referring to FIGURE 1, the numeral 10 designates a casing, illustrated as cylindrical in transverse section and formed of any suitable material. The casing is provided with upper and lower heads 11 and 12 and through the non-conductive upper head 11 projects an electrical conductor 13 which may be connected to the negative side of a high voltage power supply. The conductor 13 is connected to an electrostatic discharge plate 14 having spaced points 15 for the discharging of high voltage electric charges therebeneath. Spaced below the plate 14 and supported on the bottom conductive plate 12 is arranged one or more matrices 16 which may be formed of any suitable porous material, for example, polyurethane foam. The lower matrix, as illustrated, may be supported directly on the bottom plate 12, and the latter is grounded as at 17 or connected to the other pole of the high voltage power supply.

Connected to the casing 10 is an inlet duct 18 through which is fed dirty high-resistivity liquid, that is, an oil or the like generally non-conductive liquid containing particulate matter and/or contaminating conductive immiscible liquids such as water to be removed in the apparatus. The cleaned and decontaminated liquid flows from the apparatus through an outlet duct 19. The ducts 18 and 19 and the space 20 beneath the discharge electrode 14 constitute a flow path for the oil, and under the influence of the high voltage electric charges from the points of electrodes 15, the contaminating matter is driven downwardly into the matrix 16, as further described below.

The particulate particles are primarily driven into the non-conducting matrix by virtue of the turbulent mixing of the fluid due to the highly divergent field and are held in the non-conducting matrix by the charge induced on the particulate matter. Thus, two principal forces are cooperating in the particulate removal process: turbulent flow of liquid and electric field forces, both projecting the particles through the liquid into the matrix. The synergistic effects of high electric field strength and turbulence in cooperation with the matrix medium provide the efficient cleaning of the system.

A modified form of a somewhat more sophisticated system is shown in FIGURE 2 in which an axially elongated casing 24 is provided having a conducting rod 25 extending axially through the greater portion of the length thereof. This rod may be suitably supported at its upper end by an electrical insulator 26 and connected to a high voltage cable 27 leading to a source of power supply 28. A second terminal of the power supply is connected to a cable 30 grounded as at 31, and the cable 30 is connected as at 32 to the casing 24, which will be of conducting material for a reason which will become apparent.

Adjacent the bottom thereof the casing 24 is provided with a conductive supporting plate 34 on which rests a matrix 35 of the type referred to above. The space 36 beneath the bottom plate is part of a circulatory system to be described.

In a plane spaced above the matrix 35 is arranged another matrix 38 fixed in any suitable way to a conducting plate 39 over which is supported another matrix 40. In the space between the matrices 35 and 38 is arranged an electrostatic plate 41 secured about central opening 49' to the conducting rod 25. The plate 41 is provided with downwardly projecting needle-like electrodes 42 and upwardly projecting needle-like electrodes 43, and both sets of these electrodes may be of the same type as the electrodes 15 in FIGURE 1. The plate 41 and associated electrodes are shown in FIGURES 3 and 4. It will be noted in FIGURE 3 that the electrodes are substantially equidistantly spaced from each other radially and circumferentially to provide uniform distribution of individual highly divergent electric field sources opposite the cooperating matrix.

The plate 34 and matrix 35 are each provided with an axial opening 46 therethrough of substantially larger diameter than the conducting rod 25 for the flow of liquid from the space or chamber 36 into the space 47 around the plate 41. The matrix unit comprising the matrices 38 and 40 and plate 39 is similarly apertured as at 49. Above the matrix 40 is another of the chambers 47 surrounding a further electrostatic plate 41 and associated electrodes secured to rod 25, and it will be apparent that the unit comprising elements 38, 39 and 40 is similarly repeated at intervals substantially throughout the height of the casing 24, and the plates 39 and 34 of the various matrix units are grounded on the casing 24 and are thus connected to the power supply through conductors 32 and 30.

The high-resistivity liquid to be treated flows into the chamber 36 through an inlet pipe 52 in which are arranged a valve 53 and pump 54. Liquid from the top of the casing 24 is discharged through a pipe 55 having a valve 56 therein. From the pipe 55, a pipe 58, valved as at 59, leads to a reservoir 60 and from the reservoir a pipe 61, valved as at 62, leads to the inlet pipe between the valve 53 and pump 54. Various modifications of the system may be resorted to, for example, for the purpose of recirculating the liquid from the pipe 55 to the pipe 54, such alternative means forming per se no part of the present invention.

Various types of electrostatic discharge plates may be employed as suggested in FIGURES 5 and 6. In these figures, a circular plate 65, of suitable sheet metal, and similar in size and purpose to the plate 41, may be struck to provide pointed fingers 66 to provide the electrostatic discharge electrodes.

OPERATION

It will become apparent that although negative polarity high voltage DC energization is shown for use with the system, other arrangements may be used such as positive polarity, AC and pulse energization as is known in the electrostatic precipitaion art. In the form of the invention shown in FIGURE 1, the liquid to be cleaned is fed continuously through the duct 18, through space 20 and outwardly through duct 19. The high voltage electrodes 15 impress a very high electric field in the vicinity of the points of the electrodes and the particles such as fine road dust, metallic fines, water and the like in the oil being cleaned acquire an electric charge, negative in the present case. These particles are driven into the porous matrix medium under the influence of the electric field. The electrical discharge also creates turbulence in the liquid being decontaminated which assists in bringing the particulate material into an effective zone of one or more of the electric discharge fields, thus improving the efficiency of the apparatus. The porous matrix holds particles which have been embedded deeply therein by the pressure and force of the electric field. Oil heavily contaminated with aluminum powder, for example, can be clarified usually in a few minutes. Electric fields corresponding to 20 to 60 k.v./inch are typical but not restrictive.

In the form of the invention shown in FIGURE 2, the liquid is subjected to repeated electrostatic discharge actions. With the valves 59 and 62 closed and the valves 53 and 56 open, liquid will be pumped into the chamber 36, upwardly through the opening 46 and will pass into the chamber 47 to flow radially outwardly of the plate 41, thence radially inwardly and into the next upper chamber 47 through the opening 49. Thus the liquid is subjected to repeated electrostatic action in the successive chambers 47 and the liquid is discharged through the pipe 55 and suitably collected. If desired, the valve 56 may be closed and the valve 59 opened, in which case the liquid will flow into the reservoir 60. If it should be desired to re-treat the liquid in the reservoir, the valve 62 may be opened, in which case liquid from the reservoir will be pumped through the casing 24 in the manner described. If recirculation is to be resorted to, the valves 53 and 56 may be closed, after the system is charged with the liquid to be cleaned, and the valves 59 and 62 opened, in which case the liquid will be recirculated through the reservoir as many times as desired and then discharged by closing the valve 59 and opening the valve 56.

The method and apparatus affords substantial advantages in use. Super-cleaning of some fluids is not only feasible but can be done on a unipass basis in a continuous industrial production system. High performance can be obtained with relatively small-size equipment requiring a very low pressure drop between the inlet and outlet and with negligible electrical power consumption. Unipass removal efficiency of at least 99 percent can be readily achieved on +5 micron particles (fines below 5 micron are similarly removed as indicated by silting indices). Effective removal of particles typically occurs in the 0 to 100 micron range. Moreover, the apparatus is operative with substantial differences in temperatures and pressures.

The particular material employed in the matrices is optional, so long as such material is porous and not soluble in the fluids being treated; for example, tests have been made using a cotton gauze-like pad. Under the impact of the particles pores of the pad are opened and expanded, thus allowing additional dirt to be deposited within the medium. It has been found that whenever suitable matrix material has been used, entrapment to a substantial extent takes place, a greater quantity of particles being entrapped than can be accommodated through any filters through which the liquid passes. In addition to cotton pads, typical matrix media may comprise plastic foams made from polyurethane, Teflon and the like, glass fibers, sintered ceramics, etc.

The use of very sharp electrode points provides highly localized electric fields, and subjects the particles to high pressure which drives them into the matrix where they are retained. It has also been found that loose or resilient matrix media will expand as it becomes filled with particles, thus allowing more particles to be driven in to secure maximum use of the matrix collectors. The pore sizes of the matrix do not have to be made small to accept and hold fine particles, since the electric field drives the particles deep within the matrix. A very satisfactory matrix has been made from polyurethane foam having 60 pores per linear inch and a thickness in the order of about ¼ inch. Unlike a filter, no pressure drop occurs through the presence of the matrix since the latter is not arranged in the line of flow. Tests using matrices having 30 to 80 pores per linear inch have provided very satisfactory decontamination of high-resistivity liquids.

From the foregoing it will be apparent that the apparatus is highly effective in carrying out its intended function, as is true of the directly related method. As to the method, it involves projecting an electrostatic field into a flowing body of liquid to drive particles therefrom into a collecting matrix which entraps the particulate material without restricting the flow of the liquid. The method also involves the use of a substantial number of electrostatic discharges so as to effectively subject the flowing liquid to a number of fields for the effective driving of particles from the liquid, and the use of the force imparted to the particles to embed the particles in a particle-collecting matrix. The method also contemplates utilizing the high voltage discharges for creating turbulence in the liquid as it passes through the discharge fields to insure a more efficient removal of the particulate material from generally non-conductive liquids or liquid mixtures.

It has been found that the method and apparatus are useful in separating both conductive and non-conductive particles from high-resistivity liquids, and in the de-emulsification of such liquids.

Example I

An oil commercially available under the trademark Sunvis 931 having a viscosity range of 100–200 centistokes at 70–100° F. and an electrical resistivity of $1.0 \times 10^{14}$ ohm-cm. at applied voltages of less than about 5 k.v. DC/inch was contaminated with water and about 1 gram of particulate material per gallon of oil or 300 p.p.m. by weight. The contaminated oil was passed through apparatus of the type illustrated in FIGURE 1 wherein the total plate area was 60 sq. inches and the discharge plate was provided with 160 discharge points. The matrix consisted of ¼ inch polyurethane foam porosity grade 45–80 p.p.i. The discharge point to foam surface was about ¼ inch. Initially, the applied voltage was 8 k.v. However, as the moisture was removed from the oil the voltage was raised to 20 k.v. (40 k.v./inch average field strength). The electrical breakdown of the cleaned oil increased to more than 170 k.v. DC/inch indicating the removal of moisture as well as particles.

Example II

A petroleum naphtha feedstock having a viscosity of 0.5–1.0 at 70–90° F. was contaminated with Arizona road dust having the following typical particle size distribution by weight.

Percent:
| | |
|---|---|
| 12 | $<5\mu$ |
| 24 | $<10\mu$ |
| 44 | $<30\mu$ |
| 100 | $<200\mu$ |

The contaminated feedstock was passed through the apparatus described in Example I except the polyurethane matrix was replaced by a cotton gauge matrix sewn to the plate electrode and 99% of the contaminant was removed on a single pass.

Example III

Kerosene purchased locally having the following "as received" analysis:

(1) Electrical resistivity—$8 \times 10^{13}$ ohm-cm.
(2) Electrical breakdown—>200 volts/mil.
(3) Water content—57 p.p.m. by volume.
(4) Specific gravity—0.817 gm./ml.
(5) Viscosity—about 3 centistokes at 70° F.
(6) Cloud point—between −50° and −60° F.

was mixed with wax.

The wax used in the test was typical of that found in fuel oil.

The cloud points were determined by slowly cooling samples in an environmental chamber and noting the temperatures at which wax crystals first formed.

A solution of about 1.8% wax by weight in kerosene was prepared for treating in a 1.5 gallon electrostatic filter of the type illustrated in FIGURE 2. The cloud point of this solution was 6.8° F. With an ambient temperature of 82° F. and between 15–20 k.v. on the filter, the kerosene-wax solution was recirculated for a filter residence time of 12 minutes and a sample taken. The cloud point of this sample was 6.8° F. or no different than before electrostatic treatment.

The above solution was cooled to 6.8° F. while mixing in the reservoir and recirculating through the de-energized filter. At this temperature, wax crystals started to form and the solution was then held at a temperature between 5° and 6.8° F. and 20 k.v. applied to the filter. Samples were taken after 1.8, 4 and 12 minute filter residence times. The solution was essentially clear of crystals after 1.8 minutes. All three samples had the same cloud point of 3.2° F. or a drop of 3.6° F. Subsequent cooling down to −5.8° F. with additional wax crystallization followed by electrostatic filtration, lowered the cloud point of the kerosene to $-7.6°$ F.

In Example III "filter residence time" in minutes equals $$\frac{\text{effective filter length (inches)}}{\text{fluid velocity (in./min.)}}$$

where fluid velocity equals $$\frac{\text{fluid flow rate (g.p.m.)} \times 231}{\text{effective filter cross-section (in.}^2\text{)}}$$

It is to be understood that the steps in the method and the details of construction of the apparatus are illustratively described and shown and that changes therein may be made without departing from the spirit of the invention or the scope of the appended claims.

I claim:

1. Apparatus for separating particulate contaminants from a high-resistivity liquid comprising an elongated casing, a plurality of grounded electrically conducting plates in said casing arranged transversely thereof and spaced from each other, an electrically conducting electrostatic discharge plate in said casing arranged between each adjacent pair of grounded plates, a porous matrix carried by each grounded plate at the side thereof facing the associated discharge plate, said matrices and said grounded plates having openings therethrough to form a liquid flow path through each grounded plate and its associated matrix, radially outwardly around the associated discharge plate, radially inwardly of said grounded plate and through the next opening, means for effecting a fluid flow through said path, and means for subjecting each discharge plate to a high voltage current.

2. Apparatus according to claim 1 wherein each discharge plate is provided with pointed electrodes dispersed over and projecting from at least one side thereof to provide a plurality of electrostatic discharge points from each discharge plate.

3. Apparatus according to claim 1 wherein each discharge plate is provided with pointed electrodes dispersed over and projecting from each face thereof to subject the liquid to a plurality of electrostatic discharge points from each side of each discharge plate.

4. Apparatus according to claim 1 wherein said means for subjecting said discharge plates to high voltage current comprises a conducting rod in said casing of smaller diameter than and projecting through said openings in the grounded plates, said rod being electrically connected to said discharge plates and supporting the latter in said casing.

References Cited

UNITED STATES PATENTS

| | | | |
|---|---|---|---|
| 661,189 | 11/1900 | Olsen et al. | 210—266 |
| 1,414,079 | 4/1922 | Giebner | 204—305 |
| 2,116,509 | 5/1938 | Cottrell | 204—302 |
| 3,190,827 | 6/1965 | Kok et al. | 204—302 |
| 3,252,885 | 5/1966 | Griswold | 204—302 |

HOWARD S. WILLIAMS, *Primary Examiner.*

JOHN H. MACK, *Examiner.*

T. TUFARIELLO, *Assistant Examiner.*